United States Patent [19]
Jones

[11] 3,959,060
[45] May 25, 1976

[54] METHOD OF MAKING FISHING LURE WITH DECORATIVE WEIGHTING

[76] Inventor: William H. Jones, 8721 Elm St., Kansas City, Mo. 64138

[22] Filed: Dec. 13, 1974

[21] Appl. No.: 532,401

[52] U.S. Cl. ............................. 156/245; 43/42.25; 43/42.28; 43/42.33; 43/42.39; 43/42.53; 156/293; 156/294; 264/271; 264/279; 264/328

[51] Int. Cl.² ................... A01K 85/00; B29D 3/00; B29F 1/10

[58] Field of Search ........... 156/242, 245, 279, 293, 156/294; 264/271, 279, 328; 43/35, 42, 42.25, 42.28, 42.32, 42.33, 42.34, 42.35, 42.39, 42.45, 42.48, 42.53

[56] References Cited
UNITED STATES PATENTS

| | | | |
|---|---|---|---|
| 2,333,484 | 11/1943 | Miles | 43/42.33 |
| 2,643,418 | 6/1953 | Auldridge | 264/271 |
| 2,736,123 | 2/1956 | Peterson | 43/42.39 |
| 2,938,293 | 5/1960 | Richardson | 43/42.39 |
| 3,611,614 | 10/1971 | Ward | 43/42.39 |

*Primary Examiner*—Caleb Weston
*Attorney, Agent, or Firm*—Lowe, Kokjer, Kircher

[57] ABSTRACT

A fishing lure comprises a molded plastic body in which a plurality of lead pellets are uniformly dispersed to weight the lure and give it a visibly distinct, speckled exterior appearance. The lure has a tail portion comprised of distinctly colored feathers which are received within a generally tubular orifice at the rear of the lure body.

The method of manufacturing the lure comprises the steps of correctly aligning a hook in an appropriate mold, injecting a thermosetting PVC plastic into the cavity interiorly of the mold, adding lead pellets to the plastic before it hardens so that the pellets will become distributed therein, inserting a core pin at the rear of the lure, appropriately heating the lure to harden the plastic, removing the core pin after the plastic has hardened, thereby creating a tubular orifice at the rear of the lure, and inserting feathers into the orifice and gluing them to the lure, thereby providing a tail.

4 Claims, 2 Drawing Figures

METHOD OF MAKING FISHING LURE WITH DECORATIVE WEIGHTING

BACKGROUND AND SUMMARY OF THE INVENTION

This invention relates generally to fishing lures and more particularly to those comparatively small, weighted lures for underwater use which are commonly referred to as "jigs."

Jigs and related lures generally comprise a typically metallic head portion (which is molded around the upper shank portion of a fishing hook) and a tail portion which is attached at the rear of the head to give the lure a lifelike appearance. The tail may comprise feather(s) which are tied to the lure by a metallic or plastic strap. In the known art, coloration is generally provided by painting the lure head and/or by dyeing the tail feathers. Where desired, additional body features such as eyes, spots or stripes are also painted on the lure head.

Because of their weight, jigs are usually fished under water rather than on the surface. When a jig is retrieved it will emulate a minnow or other small fish, particularly when the angler pulls it through the water by short jerky movements from side to side and up and down. "Jigging" (the above described movement) will cause the tail portion to wiggle like a small fish in response to the short, jerky movements thereby imparted to the jig's lead head. It is well known that small fishing lures of the "jig" family are particularly effective in attracting and catching crappies, walleye, perch, bass and various other game fish.

However, the usable life expectancy of prior art jigs is not very great. In normal use, a jig will encounter rocks, tree branches and other impediments as it is retrieved through the water. The jig will also be subjected to corrosion from salt or fresh water and from temperature extremes which vary from hot summer afternoons to cold winter nights. Accordingly, the painted surfaces of the lure will soon deteriorate or become marred. This problem is particularly characteristic of jigs having stripes, spots or other decorative features painted thereon. Besides marring the painted surfaces of the lure, the abrasive forces encountered in normal use will dislodge or damage the tail portion of the lure. Usually the tail comprises one or more feathers which are tied to the shank portion of the hook by string, plastic or the like. When the lure encounters a tree branch for example, it is not unusual for the tail to become untied or loose. Tail deterioration is aggravated by the fact that the tail tie down strap is located in an unprotected position at the outside of the lure.

Prior art jigs have a further disadvantage because of the manufacturing costs associated therewith. The head portion of such jigs usually comprises a lead mass which is molded around the upper part of a fish hook shank. Of course, the lead must first be heated until molten and must then be carefully poured into an appropriate mold. No further work on the lure can progress until the lure has cooled sufficiently, thus substantially increasing the assembly time. Also, the physical connection between the tail and the lure body portion produced by the above-mentioned step is of dubious strength.

The instant fishing lure comprises a relatively small, rugged lure which is ideally adapted for "jigging." The lure comprises a molded, plastic body portion which encapsulates the shank portion of a fishing hook. The lure is weighted by a plurality of relatively small, lead balls or shots which are generally uniformly dispersed within the head portion. Many of the shots border the exterior surface of the lure and are visible as "spots," thereby distinctly marking the lure while obviating the need for painting on same. So constructed, the spots are virtually immune from normal abrasion or wear and tear, being protected by the plastic lure body.

The tail portion of the instant lure comprises trailer streamers (such as brightly colored feathers) which are attached to the lure within the tubular orifice at the rear of the lure body portion. The streamers are glued interiorly of the lure so that the "junction" between the tail and the head is thus neatly protected from ordinary abrasion and wear. Consequently they are less likely to become loose or dislodged when the lure encounters underwater obstacles.

The method of assembling the lure comprises the steps of appropriately aligning a fish hook within a mold, injecting a liquid, thermosetting PVC plastic or the like, interiorly of the mold cavity, thereby surrounding the hook shank portion and forming a lure body, adding lead pellets to the plastic before it hardens so that the pellets will become distributed at one end thereof, inserting a core pin at the rear of the lure, hardening the plastic by appropriately baking same, removing the core pin after the plastic has hardened, thereby exposing a tubular orifice at the rear of the lure, and gluingly attaching feathers to the lure interiorly of the orifice to thereby provide a tail. It is to be noted that the tedious, prior art step of hand painting desired surface features on the jig has been omitted. Also, the step of tying the tail feathers to the lure has been replaced with the quicker and easier step of gluing them interiorly of the orifice.

Thus a primary object of this invention is to provide a uniquely constructed fishing lure which is rugged and abrasion resistant.

Another object of this invention is to provide a jig of the character described with distinctive surface markings which are extremely resistant to abrasion and ordinary wear. It is a feature of this invention that many of the small weights distributed within one end portion of the body are visible exteriorly of the lure thereby providing the lure with a characteristic "spotted" appearance. Also, since the pellets are encapsulated within and thus protected by the plastic body, the surface markings provided thereby are relatively immune from normal wear including abrasion.

A further object of this invention is to provide a fishing lure of the character described which can be distinctly colored without painting. It is a feature of this invention that the plastic comprising the lure body can be appropriately dyed when coloration is desired.

Yet another object of this invention is to provide a fishing lure of the character described having an easily assembled tail which is extremely resistant to deterioration. It is a feature of this invention that the tail feathers are glued to the lure body interiorly thereof rather than being tied at the exterior of the lure.

A still further object of this invention is to provide a fishing lure with the previously mentioned characteristics which is extremely likelike and attractive to fish.

Another object of this invention is to provide a quick and efficient method for producing a fishing lure of the character described.

A related object is to provide a method which eliminates the necessity of melting and pouring lead during the manufacture of fishing jigs.

These and other objects of the invention, together with the features of novelty appurtenant thereto, will appear in the course of the following description.

DETAILED DESCRIPTION OF THE INVENTION

Figure 1:
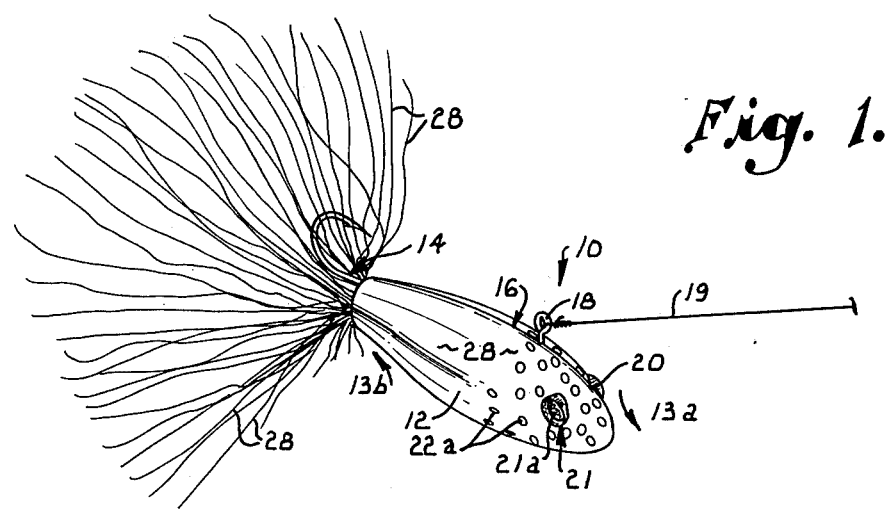
Figure 2:
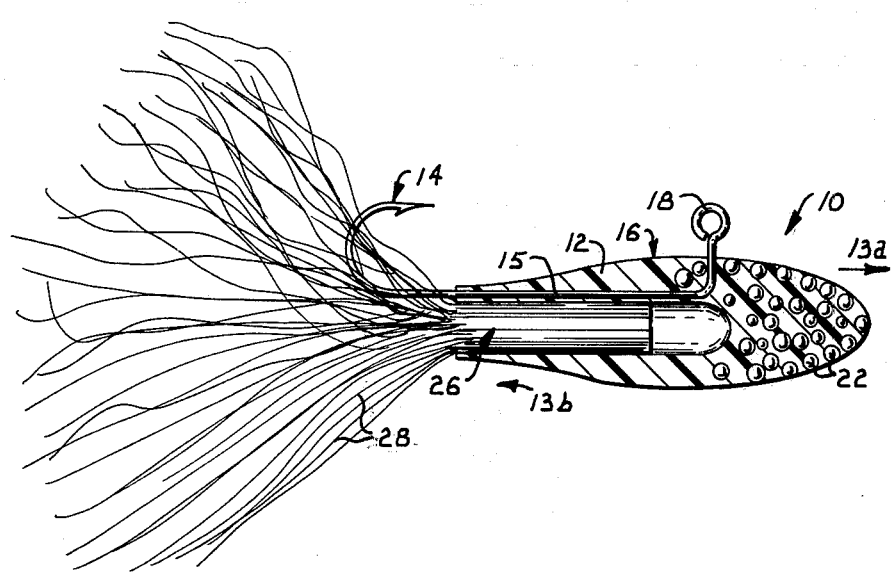

In the accompanying drawing, which forms a part of the specification and is to be read in conjunction therewith, and in which like reference numerals represent like parts in the various views:

FIG. 1 is a perspective view of a fishing lure constructed in accordance with the teachings of this invention; and FIG. 2 is an enlarged sectional view of the lure shown in FIG. 1.

With reference now to the appended drawing, a fishing lure 10 comprises a preferably molded plastic body 12 which encapsulates a conventional fish hook 14. The shank portion 15 of hook 14 is disposed generally parallel with the longitudinal axis of body 12 near the upper side 16 thereof. An eyelet portion 18 of hook 14 exits from the upper body portion of the lure and is adapted to be tied to a fishline 19 in the normal manner.

Body 12 comprises a generally oblate spheroid having a front end 13a and a rear end 13b. In the preferred embodiment, the body (12) is molded from somwhat translucent plastisol or PVC. If it is necessay to color the lure, an appropriate pigment may be mixed in with the plastisol so that it will not be necessary to actually paint the lure to achieve proper bait coloring. The lure may (optionally) be provided with a decorative pair of generally circular, extruded "eye" protions 20 and 21 which are integral with body 12 and are located generally at the front end 13a thereof. A generally convex surface portion 21a on portion 21 and a similar convex portion (not shown) on portion 20 may be painted as desired to provide a pupil for the eye.

Lure 10 is appropriately weighted by several preferably lead pellets 22 (approximately "bird shot" size) which are generally uniformly distributed in body portion 12 at the front end 13a thereof. Some of the pellets 22a (FIG. 1) abut the outer surface of the lure body and are thusly exteriorly visible, giving the lure a distinctly spotted appearance. By varying the number of pellets distributed in the lure body, the weight of the lure can be easily varied without changing the shape thereof. Since each of the pellets is firmly embedded within the plastic body of the lure, the "spots" are extremely rugged and abrasion resistant.

The lure body has a tubular shaped rear orifice 26 which is formed a predetermined distance interiorly thereof. Orifice 26 receives trailer streamers 28 which comprise the tail portion of the lure. The streamers (28) comprise feathers which are glued to the lure within orifice 26 thereby protecting the junction or interface between the lure body portion 12 and the tail from obstacles encountered by the lure. The tail feathers are preferably dyed a predetermined color before attachment to the lure.

The manufacturing process commences with the step of correctly aligning hook 14 in an appropriate mold (not shown). A preferably white liquid thermosetting PVC plastic is then injected into the mold. However, if a colored lure is desired, an appropriate dye is first added to the mold to mix with the plastic so that the coloration is usually only in the forward end portion of the lure. Before the plastic sets, the lead pellets 22 are introduced into the mold and distributed by gravity generally uniformly throughout the front portion 13a of the lure body 12. Some of these pellets 22a will come to rest near the outside surface of the lure so as to give the lure a visibly speckled appearance. The number of pellets added is, of course, dependent upon the desired weight of the lure. This step permits each of the pellets to be completely coated with plastic as it flows down through the plastic in the mold toward lure end 13a, so that, once the plastic hardens, the head and the pellets therein are adhesively bonded together. As a result the abrasion resistance of the "spots" provided by the pellets is increased.

A generally cylindrical core pin (not shown) is also inserted into the lure body (at the rear portion 13b thereof) before the plastic hardens. The plastic is hardened by baking the lure. It has been found that a liquid plastisol thermosetting PVC plastic is conveniently used with the molding process and that heating the plastisol at 350° F. for 20 minutes results in the proper hardness. Afterwards, the core pin is withdrawn exposing the generally tubular rear orifice 26. With the aid of a small hand tool resembling a pickle fork, appropriately dyed trailer streamers 28 (preferably feathers) are bunched together, glued, and twistably inserted into orifice 26 to provide a tail for the lure. Thus the bond between the tail portion and lure body 12 is located interiorly of orifice 26.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A method of manufacturing a spotted fishing lure, said method comprising the steps of:
    correctly aligning a fish hook in an appropriate mold,
    injecting a liquid plastic interiorly of said mold to form a body thereby interconnecting said body and a portion of said hook,
    introducing a plurality of pellets into the mold thereby distributing said pellets within said body,
    inserting a core pin in said mold before hardening said plastic,
    hardening said plastic,
    withdrawing said core pin after hardening said plastic, thereby exposing an orifice in said lure body, and
    attaching a tail to said lure interiorly of said orifice.

2. The method as in claim 1 wherein the hardening step includes the step of heating said liquid plastic in said mold for a predetermined period of time.

3. The method as in claim 1 wherein said attaching step comprises the additional steps of:
    forming a flexible tail,
    applying adhesive to said flexible tail, and inserting said flexible tail interiorly of said orifice, thereby adhesively attaching said flexible tail to said lure.

4. The method as in claim 3 including the additional step of coloring said plastic by injecting dye into said mold.

* * * * *